Nov. 9, 1954 M. V. KALFAIAN 2,694,114
AMPLIFIER WITH CONTINUOUS SERVO-CONTROL FOR CONSTANT GAIN
Filed Oct. 19, 1953

E : E' = FIXED GAIN OF THE SERVO-CONTROLLED AMPLIFIER

INVENTOR.
Meyer V. Kalfaian

United States Patent Office 2,694,114

Patented Nov. 9, 1954

2,694,114

AMPLIFIER WITH CONTINUOUS SERVO-CONTROL FOR CONSTANT GAIN

Meguer V. Kalfaian, Los Angeles, Calif.

Application October 19, 1953, Serial No. 386,983

4 Claims. (Cl. 179—171)

Figure 1:
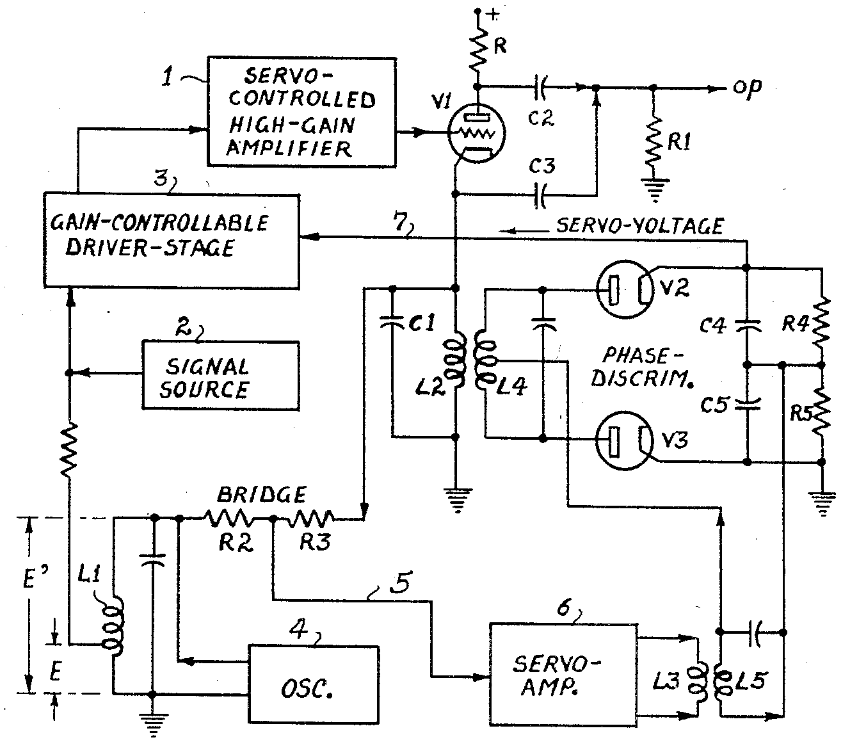

The present invention relates to signal amplifying systems, and more particularly to methods and means for controlling the input-to-output gain of an amplifier continuously to a constant state, without interrupting its operation. Its main object is to provide a servo-system which is capable of regulating the gain of an amplifier continuously to a predetermined value without interrupting its operation.

Amplifiers are often required to possess constant gain of a known factor, whereby certain voltage values can be measured directly without involving reference values for comparison purposes. In various other cases where more than one amplifier is employed, it often becomes imperative that they all possess similar gain factors during long periods of operation. For example, in a simultaneous type of color television, the camera picks up three different video signals from the object that is televised, each one of which represents one of a primary-color component of the image signal. The output signal level of the camera is usually very low, and accordingly, the three primary-color video signals are amplified before modulating the carrier wave. Since production of true color hues depends upon accurate mixture of these primary-color signals, it becomes imperative that the three separate amplifiers provide the same amount of amplification, or at least, at predetermined amounts. It is accordingly the object of this invention to provide a servo-controlled amplifier, the gain of which may be predetermined without being subject to further variation during long periods of operation.

In the preferred embodiment of this invention, one exemplary method of servo-controlling an amplifier comprises the following steps: Producing signal waves to be amplified; producing an oscillatory wave having a frequency outside the regions of a band embracing the signal waves; dividing the amplitude of said oscillation into first and second fixed steps, the ratio between the two steps representing a predetermined input-to-output gain of the amplifier; amplifying the first step of said oscillatory wave by the amplifier; measuring the difference of amplitude between the output of amplifier and said second step as a function of gain-deviation from said predetermined value; utilizing said difference to control the gain of the amplifier until said difference is nullified, thereby locking-in the gain of the amplifier to said predetermined ratio; and cancelling out the amplified oscillatory wave from the amplified signal waves by way of said frequency differences.

For further understanding of the objects and features of this invention, reference is now made to the following detailed description of certain illustrative embodiments showing the preferred mode of carrying it into useful application, and the claims appended hereto will then define the invention not only as embodied in these illustrative examples, but also in a scope to embrace various other forms which it is capable of assuming in practice.

Figure 2:
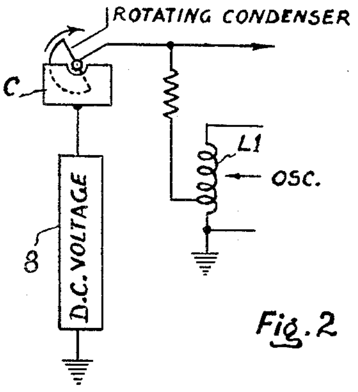
Figure 3:
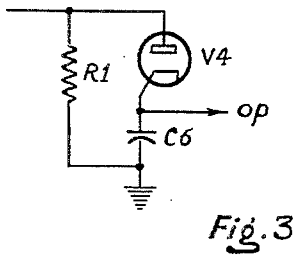

In the drawings: Fig. 1 is partly block and partly schematic diagram of the servo-controlled amplifier in accordance with the invention; and Figures 2 and 3 are modifications thereof.

Referring now to the diagram of Fig. 1, the block 1 represents the amplifier which is to be servo-controlled for constant gain operation. The signal to be amplified, from source 2, is first applied to a driver stage in block 3, the amplitude-gain of which is controllable by the arriving servo-voltages. Thus, any amplitude-gain change taking place through amplifier 1, and the driver stage combined, may be compensated for by varying the amplitude-gain of the driver stage 3. The driver stage 3 is simultaneously driven by an oscillatory wave from the oscillator block 4. The frequency of this oscillation is chosen outside the region of the band that embraces the signal frequencies, so that they may be easily separated at the output of amplifier 1. The voltage output of oscillator 4 is divided across inductance L1 into two fixed steps, namely, E and E′, the ratio of which represents a predetermined amplitude gain of the amplifier. As shown in the drawing, the smaller voltage step E is applied upon the input of driver stage 3, simultaneously with the signal voltage from source 2. Both the signal and oscillatory wave are amplified through driver stage 3 and the main amplifier 1, and applied upon the control grid of output cathode follower tube V1. The cathode circuit inductance L2 is resonated to the frequency of said oscillation, by the capacitive element C1, and the value of anode circuit resistance R is adjusted equal to that of the cathode circuit impedance at that frequency. The outputs of these anode and cathode circuits are then parallel coupled to a common output circuit comprising resistance R1, through similar capacitive elements C2 and C3, so that the two oscillatory waves arriving in opposite phases at R1 are substantially completely cancelled out; leaving only the amplified signal waves. Thus the output signal from across R1 may be utilized in a conventional mode, without being affected by the amplified oscillatory wave. For more effective separation between signal wave and oscillatory wave however, the amplifier is preferably made as linear as instrumentation permits, and the driver stage driven at low levels, so that one voltage will not modulate the other.

As indicated in the foregoing, the voltage ratio between E and E′ represents the amplifier gain to be servo-controlled. Accordingly, it is assumed that the peak voltage across L2 should be equal to that of the voltage E′. The number of stages of the amplifier is so arranged that, when the voltage E′ changes to one polarity, the voltage across L2 changes to the opposite polarity. These two voltages are bridged across R2 and R3, and an output terminal 5 from the junction of these two resistors is taken to connect to the input of servo-amplifier 6. Thus, when the amplitude of oscillatory voltage across L2 is equal to that of E′, the output terminal 5 will contain zero voltage. Whereas, when these two voltages are of unequal amplitudes, the difference will appear at terminal 5, and amplified through servo-amplifier 6, in one of two opposite phases depending on which of the two signals is of higher amplitude.

The output oscillatory waves across L2 and L3 are inductively coupled to L4 and L5, in respective order, and applied upon the phase discriminator circuit comprising rectifier tubes V2, V3, and a load impedance comprising resistances R4 and R5 shunted by condensers C4 and C5. The general circuitry of this phase discriminator is similar to the type generally known as the Seely Foster type, but in this case, the phase angle of the voltage across coil L5 is in phase with the voltage across coil L4; instead of the usual 90 degree relation as generally practiced in phase discriminator circuits. Thus, any oscillatory voltage appearing across coil L5 will effect substantially a steady state voltage at terminal 7, in either positive or negative polarity, depending on which of the voltages across L1 and L2 is higher in amplitude. Accordingly, this voltage is applied upon the driver stage 3, to control and compensate for any gain change that may occur between the input of driver stage 3, and the output of amplifier 1.

It will be noted that the purpose of phase comparison between the voltages across coils L4 and L5 is to produce an output voltage of one of two opposite polarities, so that the gain of driver stage 3 may be varied in one of two opposite directions. Thus, the voltage across coil L5 may just as well be compared with the voltage across an auxiliary output circuit from the oscillator 4, in which case, the phase comparison waves may be amplified to higher amplitudes for obtaining larger servo-voltages. However, the output voltage of the phase discriminator may also be amplified. Since these circuit arrangements are conventional in various forms, further illustrative drawings are avoided herein. Similarly, bridge circuit arrangements are too numerous to be included herein, but any one of the known types may be incorporated with the present invention with satisfactory results. Other modifications may also be made, for example, the inductance L1 may be substituted by a resistive element for said voltage division. In the case of the driver stage 3, various schemes for changing its gain factor have been known, in one exemplary mode of which, the anode potential of a triode tube may be changed to vary its amplification factor.

When the servo-controlled amplifier thus described is employed for direct current signal amplification, the input signal is first interrupted by a chopper relay at some convenient frequency, so that signal admittance may be effected through the alternating current amplifier, in the form of pulses. Chopper relays are widely used in the art of electronics, such for example, in D.-C. amplifiers, and accordingly, further explanation is not necessary herein. In this type of application, it is obvious that the sharp make-and-break contacts of chopper action will produce a wide band of frequencies which might interfere with the control-oscillation of the servo system. However, these undesired frequencies may be easily avoided by the inclusion of a filter network, to cancel out the frequencies in the vicinity of the servo-oscillation frequency. Filter circuit arrangements are well known and practiced by the skilled in the art, and accordingly, further illustration is avoided in the accompanying drawings. As an alternative, the input signal may be converted into pulses by a rotating capacitor C, as shown in Fig. 2. In this case, one terminal of the capacitor is connected to the input voltage source 8, and the other terminal connected to the input of the driver stage 3, so that the impedance from voltage source to said input is varied in the form of pulses for amplification. In order to translate the amplified output pulses of the amplifier into direct current signal, the circuit arrangement of Fig. 3 may be employed, wherein, the pulsations across R1 (repeated designation of Fig. 1) are stored in capacitor C6 through rectifier tube V4. The stored potential across capacitor C6 may then be utilized in a suitable manner.

While in the foregoing I have described the principles of my invention in connection with specific apparatus, I wish it to be understood that this description, and the accompanying drawings thereof, are made by way of limited examples only, as it will be obvious to the skilled in the art of electronics that, various substitutions of parts, adaptations and modifications are possible without departing from the spirit and scope thereof.

What I claim is:

1. A servo-system for controlling the input-to-output gain of an amplifier to substantially a constant state, which comprises an amplifier to be servo-controlled; a source of signal wave or waves; a source of oscillatory wave having a frequency other than the frequency or frequencies contained in the signal waves; means for dividing the amplitude of said oscillation into first and second substantially fixed steps, the ratio between the two steps representing a predetermined input-to-output gain of the amplifier; means for applying the oscillatory wave at said first step upon the input of said amplifier for amplification; a balanced bridge network; means for applying the oscillatory wave at said second step and the output oscillatory wave of the amplifier upon said bridge in opposite phases, whereby any difference in amplitude between the two waves will pass therethrough in one of said phases depending upon which one of the two waves has a higher amplitude; a phase discriminating circuit; means for applying the oscillatory output of said bridge and the output oscillatory wave of the amplifier upon said phase discriminator for obtaining an output voltage in either positive or negative polarity, depending on the output phase angle of the bridge; a gain control means for the amplifier, and means therefor for varying the gain to higher or lower value by said positive or negative voltage until this voltage is nullified, thereby effecting substantially said constant state of gain; means for applying the signal waves upon the input of the amplifier for amplification; and means for cancelling out the amplified oscillatory wave from the amplified signal waves by way of their differences in frequency.

2. The system as set forth in claim 1, including an auxiliary amplifier, and means therefor for amplifying the output wave of said balanced bridge prior to application upon said phase discriminator.

3. The system as set forth in claim 1, wherein said phase discriminator comprises first and second impedances, the latter having a center tap terminal; means for applying the oscillatory output wave of said bridge upon the first impedance; means for applying the output oscillatory wave of said amplifier upon the second impedance in in-phase relation with the former; two rectifier devices, each having a cathode and anode, and means therefor for connecting same to the end terminals of the second circuit, and a load impedance therefor, having a center tap terminal, through which alternately rectified waves across the second impedance pass in series with the two rectifiers; and means for connecting the first impedance in series with the center tap of said second impedance and the center tap of said load impedance, whereby producing said output voltage in said negative or positive polarity across said load impedance.

4. Where a direct-current signal is to be amplified by an alternating-current amplifier, and the input-to-output gain of said amplifier is to be held to substantially a constant state by a servo system, the system of converting said direct-current signal into alternating-current signal, or equivalent thereof, and servo-controlling the gain of said amplifier into substantially said constant state, which comprises an amplifier to be servo-controlled; a source of direct-current signal or signals; a source of oscillatory wave having substantially a fixed frequency; means for dividing the amplitude of said oscillation into first and second substantially fixed steps, the ratio between the two steps representing a predetermined input-to-output gain of the amplifier; means for applying the oscillatory wave at said first step upon the input of said amplifier for amplification; a balanced bridge network; means for applying the oscillatory wave at said second step and the output oscillatory wave of the amplifier upon said bridge in opposite phases, whereby any difference in amplitude between the two waves will pass therethrough in one of said phases depending upon which one of the two waves has a higher amplitude; means for deriving an output voltage from said bridge in either positive or negative polarity, depending on the output phase angle of the bridge; a gain control means for the amplifier, and means therefor for varying the gain to higher or lower value by said positive or negative voltage until this voltage is nullified, thereby effecting substantially said constant state of gain; means for converting said source of direct-current signal or signals into pulsations at a frequency rate other than the frequency of said oscillation, and means therefor for applying these pulsations upon the input of said amplifier for amplification; and means for cancelling out the amplified oscillatory wave from the amplified signal waves by way of their differences in frequency.

References Cited in the file of this patent

UNITED STATES PATENTS

| Number | Name | Date |
| --- | --- | --- |
| 2,554,132 | Van Velst | May 22, 1951 |